US 9,928,239 B2

(12) United States Patent
Hickey et al.

(10) Patent No.: US 9,928,239 B2
(45) Date of Patent: *Mar. 27, 2018

(54) COMPARING PROJECTS

(71) Applicant: EntIT Software LLC, Sunnyvale, CA (US)

(72) Inventors: Marianne Hickey, Bristol (GB); David Trastour, Bristol (GB); Andrew Byde, Cardiff (GB); Maher Rahmouni, Bristol (GB); Claudio Bartolini, Palo Alto, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 528 days.

This patent is subject to a terminal disclaimer.

(21) Appl. No.: 14/559,053

(22) Filed: Dec. 3, 2014

(65) Prior Publication Data
US 2015/0088849 A1    Mar. 26, 2015

Related U.S. Application Data

(63) Continuation of application No. 13/636,412, filed as application No. PCT/US2010/030518 on Apr. 9, 2010, now Pat. No. 8,938,437.

(51) Int. Cl.
*G06F 17/30* (2006.01)
*G06Q 10/06* (2012.01)
(Continued)

(52) U.S. Cl.
CPC .... *G06F 17/30011* (2013.01); *G06K 9/00483* (2013.01); *G06N 99/005* (2013.01); *G06Q 10/06* (2013.01)

(58) Field of Classification Search
CPC ......... G06F 17/30864; G06F 17/30067; G06F 17/3064; G06F 17/30011
(Continued)

(56) References Cited

U.S. PATENT DOCUMENTS 6,990,628 B1 * 1/2006 Palmer ................ G06F 17/2211
707/999.003
7,158,961 B1    1/2007 Charikar
(Continued)

FOREIGN PATENT DOCUMENTS

KR    20090039092 B1    9/2009

OTHER PUBLICATIONS

Chang, H-C et al., Indexing and retrieval in machining process planning using case-based reasoning, 2000, 13 pages, University of Missouri-Rolla, USA.
(Continued)

*Primary Examiner* — James Trujillo
*Assistant Examiner* — John J Morris

(57) ABSTRACT

A project-comparator subsystem generates a similarity metric for input electronically-represented projects input to the project-comparator subsystem. A project search engine receives data that represents a first electronically-represented project, identifies, by pairwise comparison of the stored electronically-represented projects with the first electronically-represented project using the project-comparator subsystem, a stored electronically-represented project with greatest similarity to the first electronically-represented project, and outputs an indication of the identified stored electronically-represented project.

18 Claims, 17 Drawing Sheets

(51) Int. Cl.
*G06K 9/00* (2006.01)
*G06N 99/00* (2010.01)

(58) Field of Classification Search
USPC .......................................................... 707/706
See application file for complete search history.

(56) References Cited

U.S. PATENT DOCUMENTS 8,478,699 B1 * 7/2013 Alfonseca ........... G06F 17/3064
706/12
2008/0319941 A1 12/2008 Gollapudi

OTHER PUBLICATIONS

El-Kwae, Essam A. et al.., A Robust Framework for Content-Based Retrieval by Spatial Similarity in Image Databases, 1999, 25 pages, University of Miami, Florida, USA.
European Patent Office, Extended European search report for EP 10849593.8, Feb. 27, 2014 (11 pages).
Finding Similar Documents in Document Collections (Thorsten Brants and Reinh 1-15 and Stolle) In: Third International Conference on Language Resources and Evaluation (LREC-2002), Jun. 2002 (2002) (7 pages).
Korean Intellectual Property Office, International Search Report and Written Opinion of PCT/US2010/030518 dated Jan. 24, 2011 (9 pages).
Lee, Sang-Chul et al., Text, Image and Vector Graphics Based Appraisal of Contemporary Documents, 2008 Seventh Int'l Conference on Machine Learning Applications, 6 pages, Inha University, Korea.
Liao, T. Warren et al., Similarity measures for retrieval in case-based reasoning systems, 1998 Applied Artificial Intelligence, 22 pages, Louisiana State University, Louisiana, USA.
Nawei Chen, A Survey of Indexing and Retrieval of Multimodal Documents, Feb. 2006, Technical Report, 40 pages, Queen's University, Ontario, Canada.
Queiroz et al., A model for Decision Support in Business-Driven IT service portfolio Management using SLA-dependent Criteria ad under Uncertainity, Proceeding MEDES'09 Proceedings of ICMEDE, Article No. 41, Oct. 2009 (8 pages).
Rahmouni, Maher et al., Learn IT: Enhanced Search and Visualization of IT Projects, 2010, 4 pages, HP Labs, California, USA.
Rahmouni, Maher et al., Learning from Past Experiences to Enhance Decision Support in IT Change Management, 2010 IEEE / IFIP, 8 pages.
Rahmouni, Maher, Towards Enhanced Decision Support through Learning from Past Experiences, 2009, 11 pages, HP Laboratories, California, USA.
The International Bureau of WIPO, International Preliminary Report on Patentability for PCT/US2010/030518 dated Oct. 18, 2012 (6 pages).
Wan et al, Towards a unified approach to document similarity search using manifold-ranking of blocks, Science Direct, Sep. 2007 (17 pages).

* cited by examiner

COMPARING PROJECTS

CROSS REFERENCE TO RELATED APPLICATIONS

This is a continuation of U.S. application Ser. No. 13/636,412, filed Sep. 21, 2012, which is a national stage application under 35 U.S.C. § 371 of PCT/US2010/030518, filed Apr. 9, 2010, both hereby incorporated by reference.

TECHNICAL FIELD

The present invention is related to project-management applications and other project-based computational tools and applications.

BACKGROUND

Project management within various types of organizations and institutions has become, in recent decades, a large and vital component of these organizations and institutions. With the advent of cost-effective, networked computing and software applications, a variety of different applications and computing tools for facilitating project management have been developed. These tools and applications may facilitate creation of electronic documents that describe projects, tracking of project progress, project expenditures, project staffing, and other components of projects. While these tools provide great utility and functionality to project managers and others concerned with project management, project managers and various other personnel and managers involved, at various levels, with projects and project-management applications and computational tools continue to seek new and improved project-management tools and applications that provide new and useful functionality, increased efficiency, and other advantages.

DETAILED DESCRIPTION

Currently, project-management applications and tools do not provide efficient, convenient, and accurate methods and systems for identifying projects, electronically encoded and stored in project databases and other computational facilities, related to a particular project. A current approach is to use keyword-based searching of text documents related to projects, but such keyword-based searching methods are tedious, error prone, and often produce poorly defined, large result sets that require a great detail of additional review and analysis. Another current approach involves executing relational-database queries, or other database-management-system queries, with respect to project-related data stored in database management systems. These approaches depend on a rational and efficient database schema design and on use of database management systems for storing significant portions of project-related data, and are often tedious, error-prone, and difficult for project managers and other personal to use.

One embodiment of the present invention is directed to a computational system for determining the similarity between two different projects by comparing the electronic-data representations the two projects using project-feature comparators and one or more feature-similarity aggregators. According to this project-comparator embodiment, information corresponding to each of a number of project features is extracted from both projects and the extracted information from both projects for each feature is supplied to a corresponding feature comparator, which outputs a feature-similarity value. The outputs from the feature comparators are weighted and aggregated by one or more feature-similarity aggregators to produce a final project-similarity value. The project comparator system can, in turn, be employed by a project search engine, representing an additional embodiment of the present invention, to carry out pairwise project comparisons in order to identify stored projects represented by electronic data that are similar to an input project.

Figure 1:
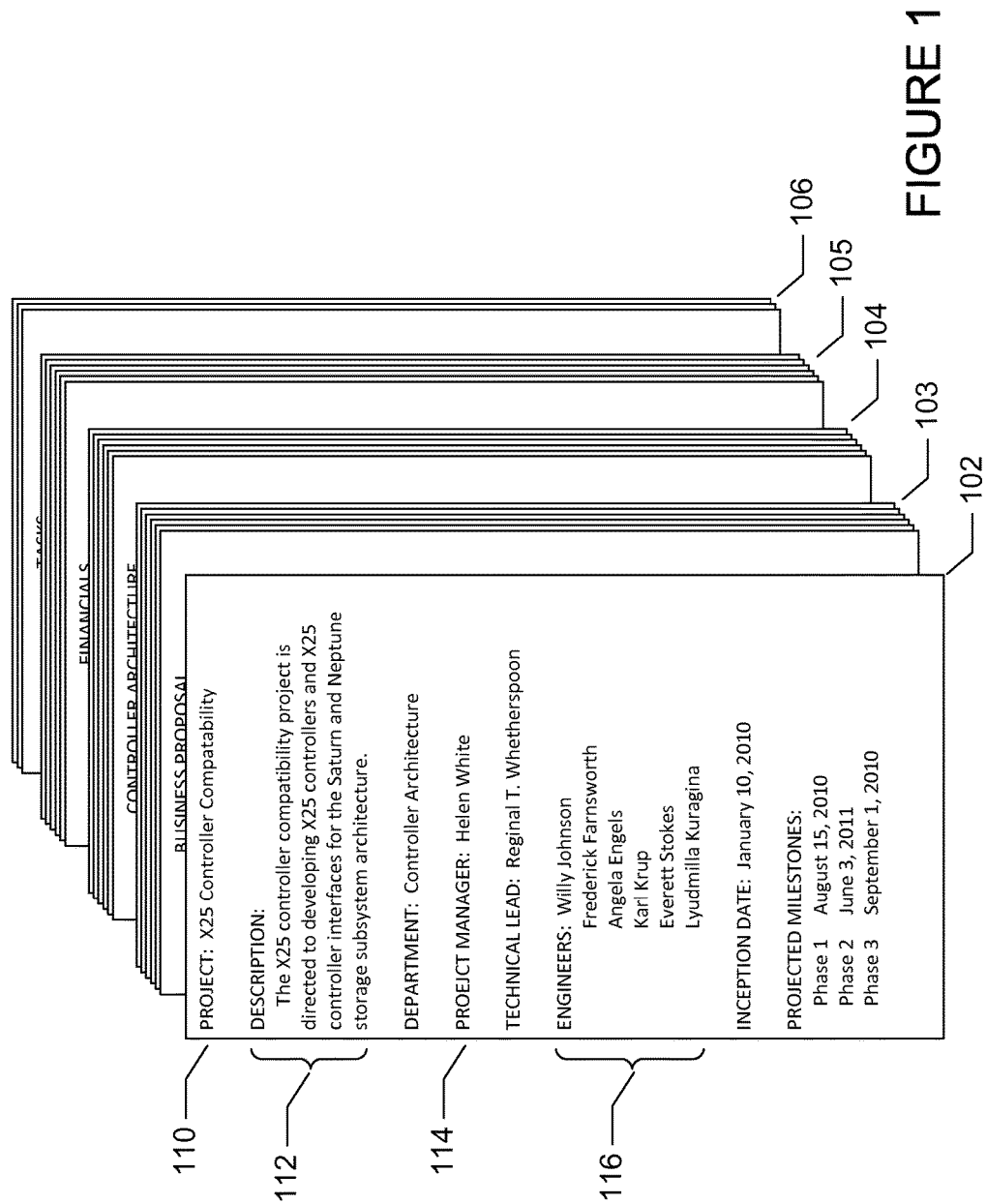
FIG. 1 illustrates an electronic-data representation of a project.

FIG. 1 illustrates an electronic-data representation of a project. The project can generally be considered to be a collection of electronic documents 102-106, each containing different types of information. Certain portions of the information may be expressed in formatted text, other portions of the information may be expressed numerically and in equations, yet other portions of the information may be expressed in graphics, graphical images, and photographs, other portions of the information may be expressed in unformatted text, and additional types of information may include application-specific application-data files.

In FIG. 1, the electronic-data representation of the project includes a project-overview document 102 that contains formatted text encoding a project title 110, a brief project description 112, the name of a project manager 114, the names of various engineers assigned to the project 116, job titles, descriptions, or roles needed for the project, often needed prior to assignment of people to jobs, and other such information. The electronic-data representation of the project also contains additional documents, including a business proposal 103, an architecture document for the device to be developed as a result of successful undertaking of the project 104, a financial statement for the project 105, and a tasks document 106 including schedules, work flows, and other information. These additional documents may contain many different types of data, including the various types of data discussed above.

One embodiment of the present invention is a computational system for comparing the electronic-data representations of two projects to produce a similarity metric that expresses a computed similarity of the two projects. In one embodiment of the present invention, the computed similarity is a real value within the range [0, 1]. In one embodiment of the present invention, the project-similarity value is computed from a number of feature-similarity values for various features of the electronic-data-representation of the project.

There are generally many ways to decompose or partition an electronic-data-representation of a project into a discrete number of representative features. For example, considering the electronic-data representation of a project shown in FIG. 1, project features may include a character string containing the project title, a variable-length character string containing a description of the project, a date corresponding to the inception date of the project, graphical objects that represent architectural-diagram overviews of the project, text and numeric data describing the project plan, including subtasks, schedules, dependencies, and work breakdown structure, mixed text and numeric data containing financial parameters for the project, text and numeric data containing resource parameters for the project, including human resource roles and the number of personnel for each role, a list of character strings containing the names of project personnel, and other such features. Identification of a set of characteristic features for a project, and extraction of data from the electronic-data representation of a project for each feature, is somewhat arbitrary. For example, a personnel feature used to characterize projects in one implementation of the project comparator may include a list of character strings that represents the names of all people involved with a project, while, in a different implementation of the project comparator, the names of those involved with the project may be distributed among roles such as project-manager, engineers, and support-staff features. In general, within any particular computational environment, electronic-data representations of projects may be somewhat standardized, and the data structures and data content for each of the various sections and entities within a standardized project description may be selected as features, for purposes of the project-comparison system that represents one embodiment of the present invention. The data associated with features may overlap, in certain implementations, and much of the data contained in an electronic-data representation of a project may be omitted from features and from consideration by the project comparator.

A variety of techniques can be used to compare the data content of a particular feature extracted from two projects being compared by a project comparator system, according to various embodiments of the present invention. Comparison techniques that produce similarity-metric values often depend strongly on the underlying data type for the information corresponding to a feature. Next, a number of different comparison methods for different types of data are discussed, as illustrations of various approaches used in feature-comparator components of a project comparator system, according to various embodiments of the present invention.

Figure 2:
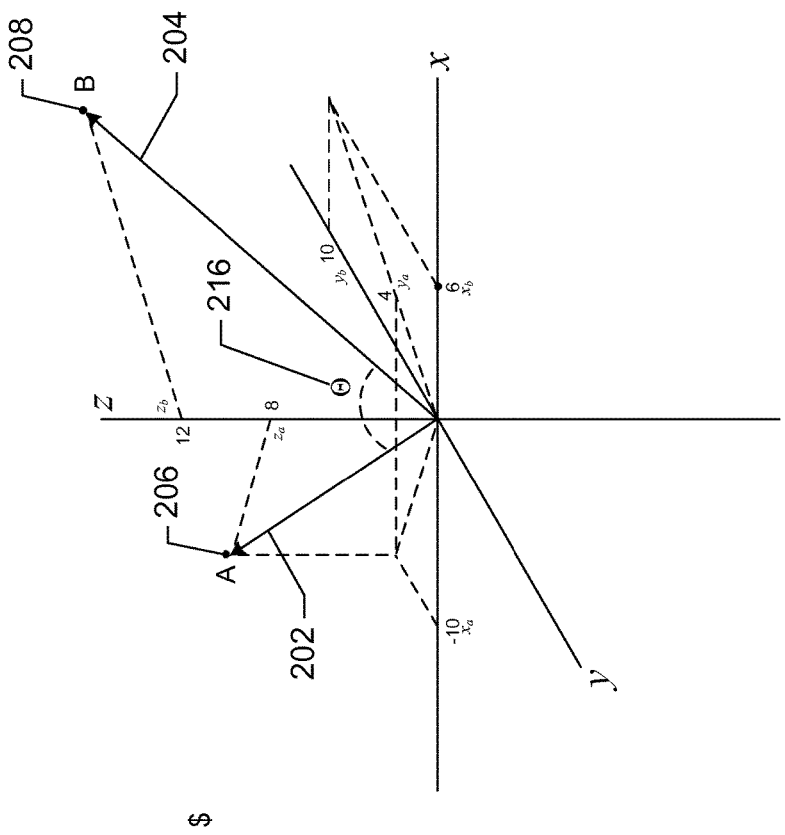
FIG. 2 illustrates a vector-based similarity metric.
Figure 3A:
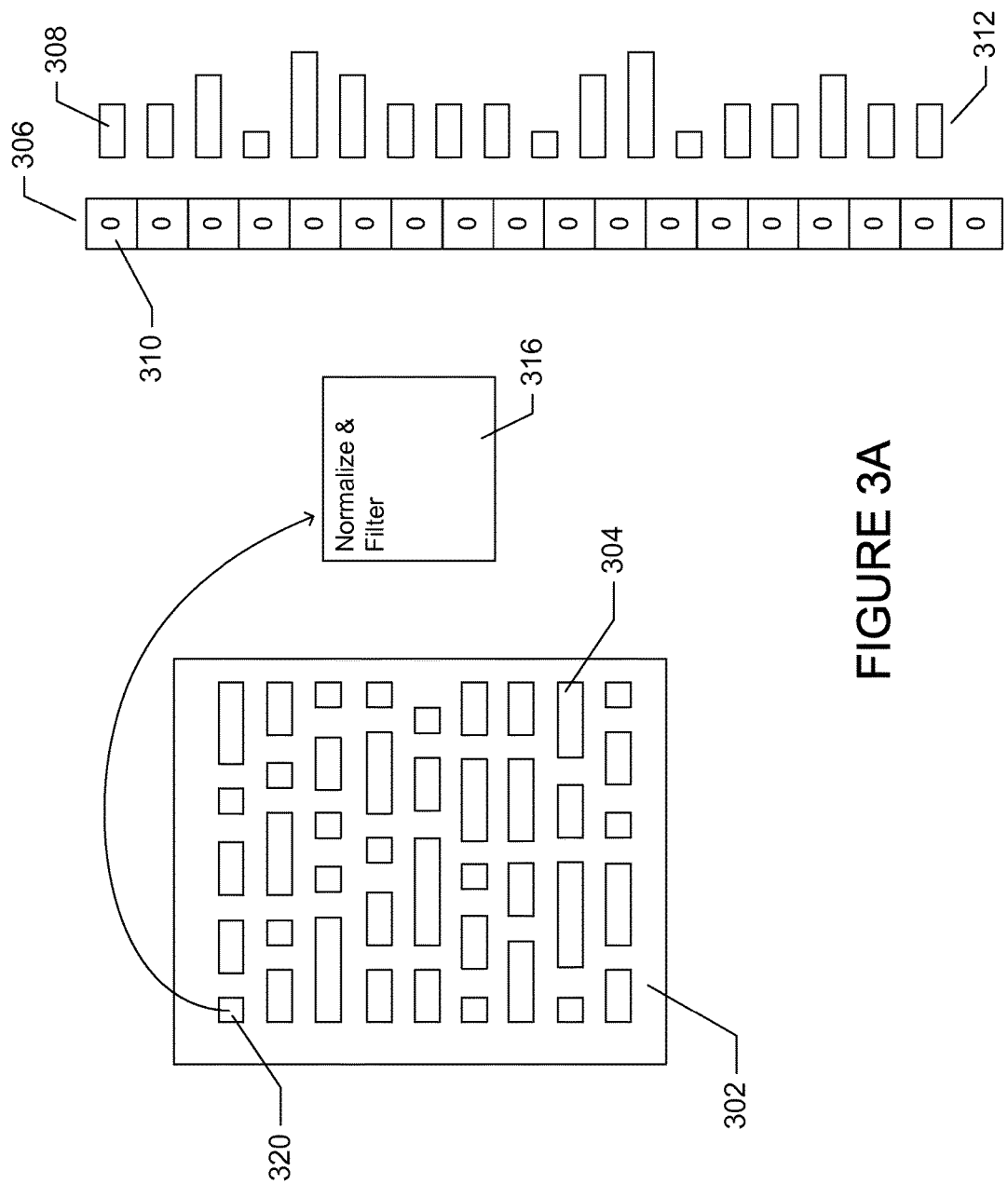
FIGS. 3A-E illustrate one approach to generating a vector that corresponds to a text document.
Figure 3B:
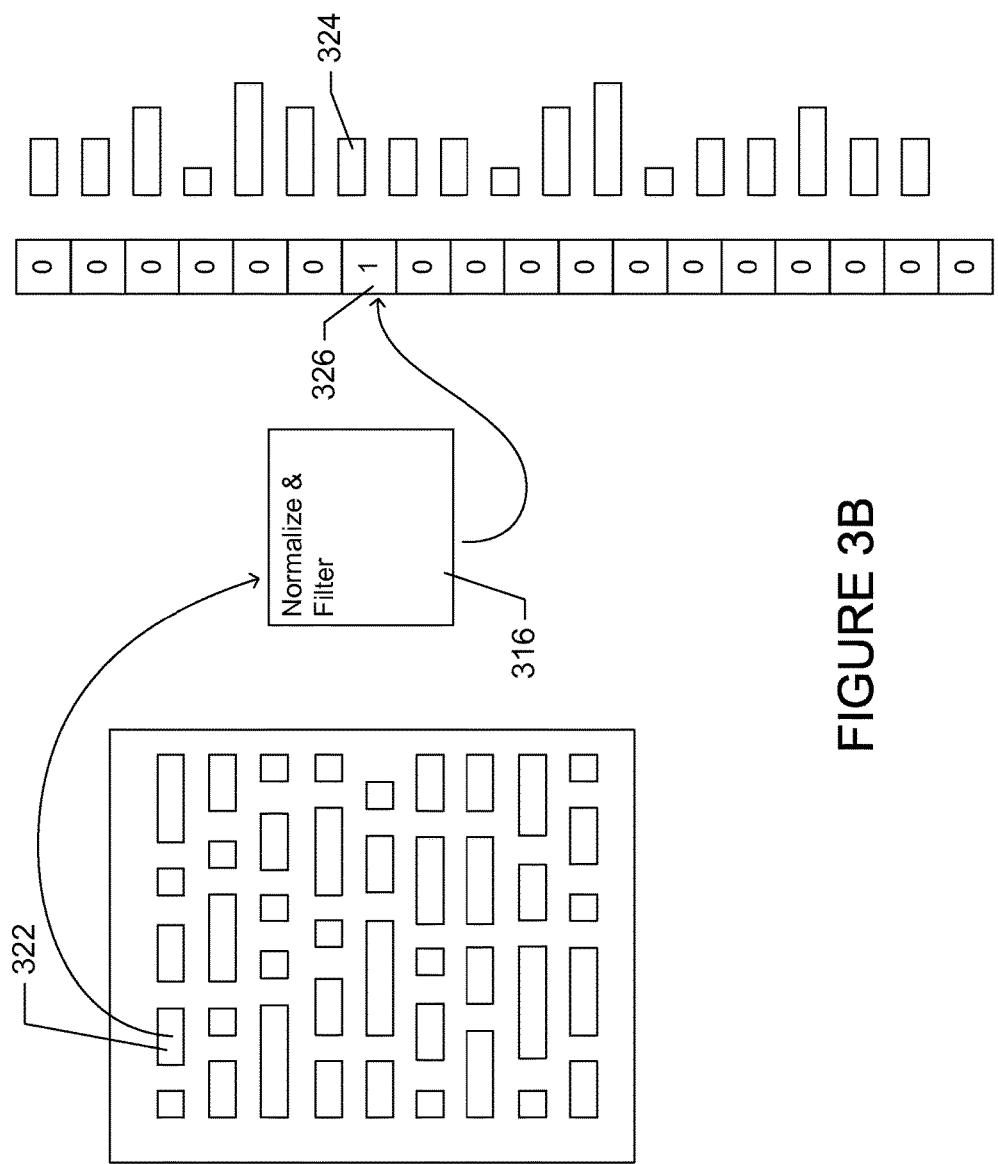
Figure 3C:
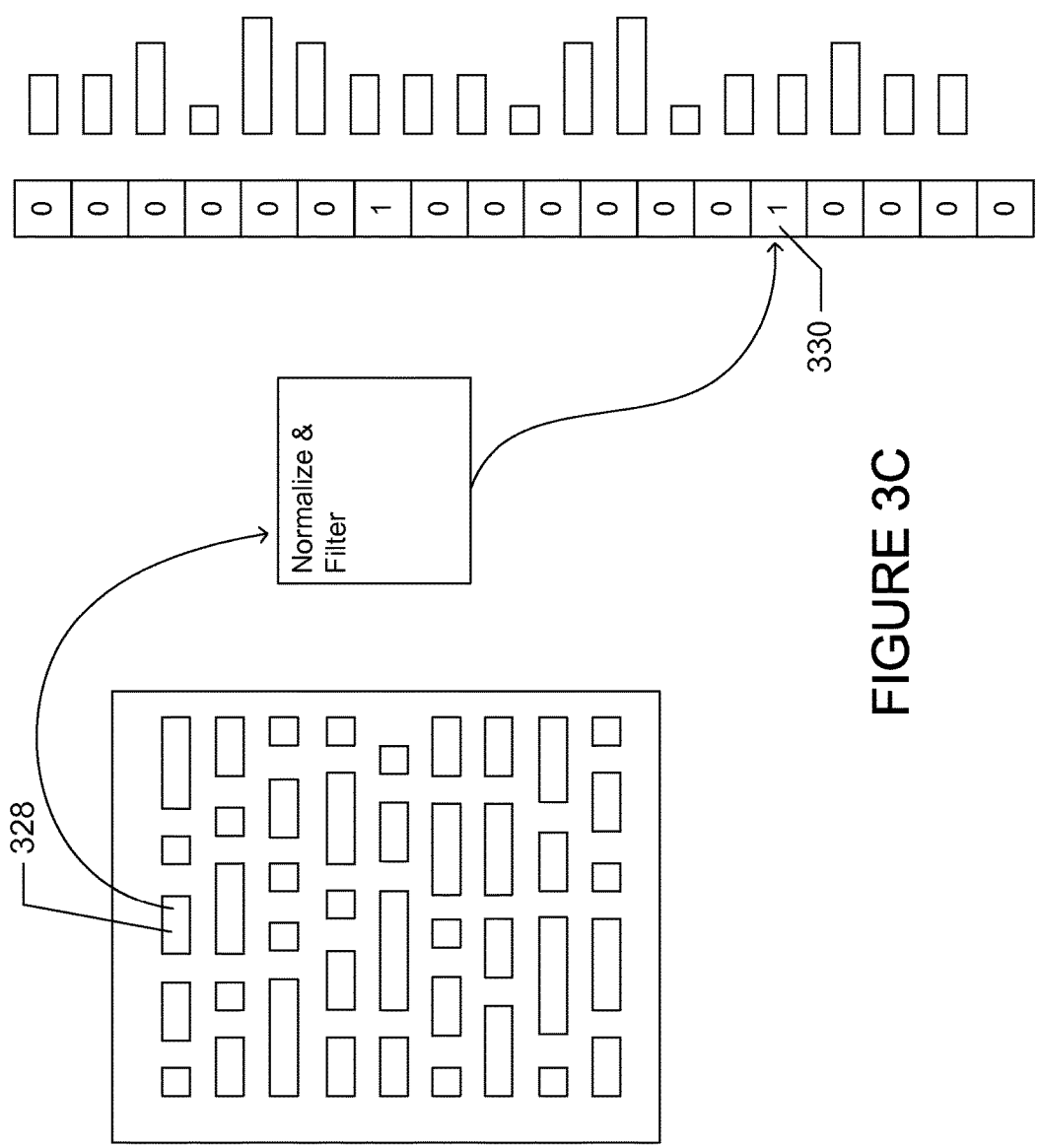
Figure 3D:
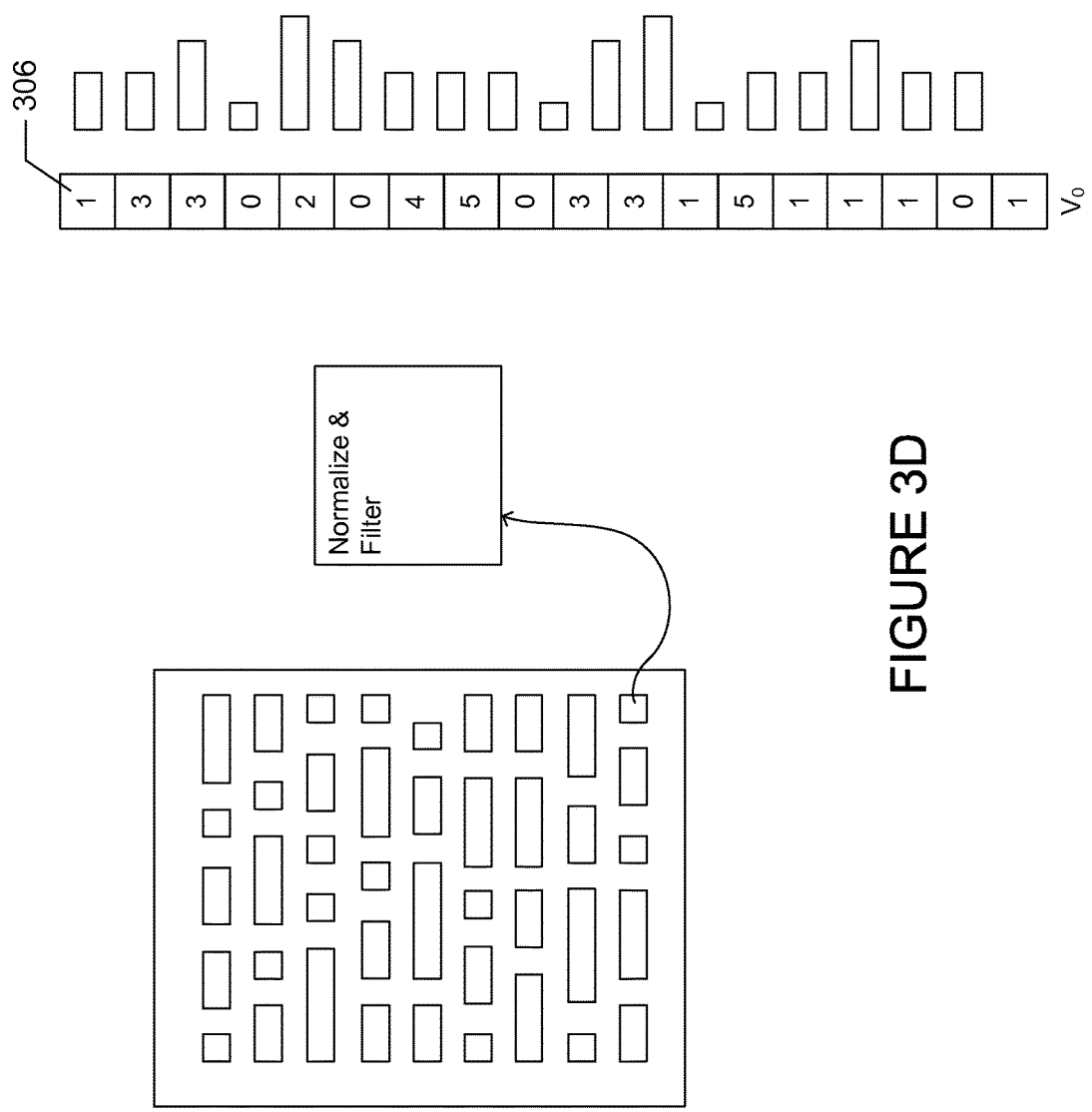
Figure 3E:
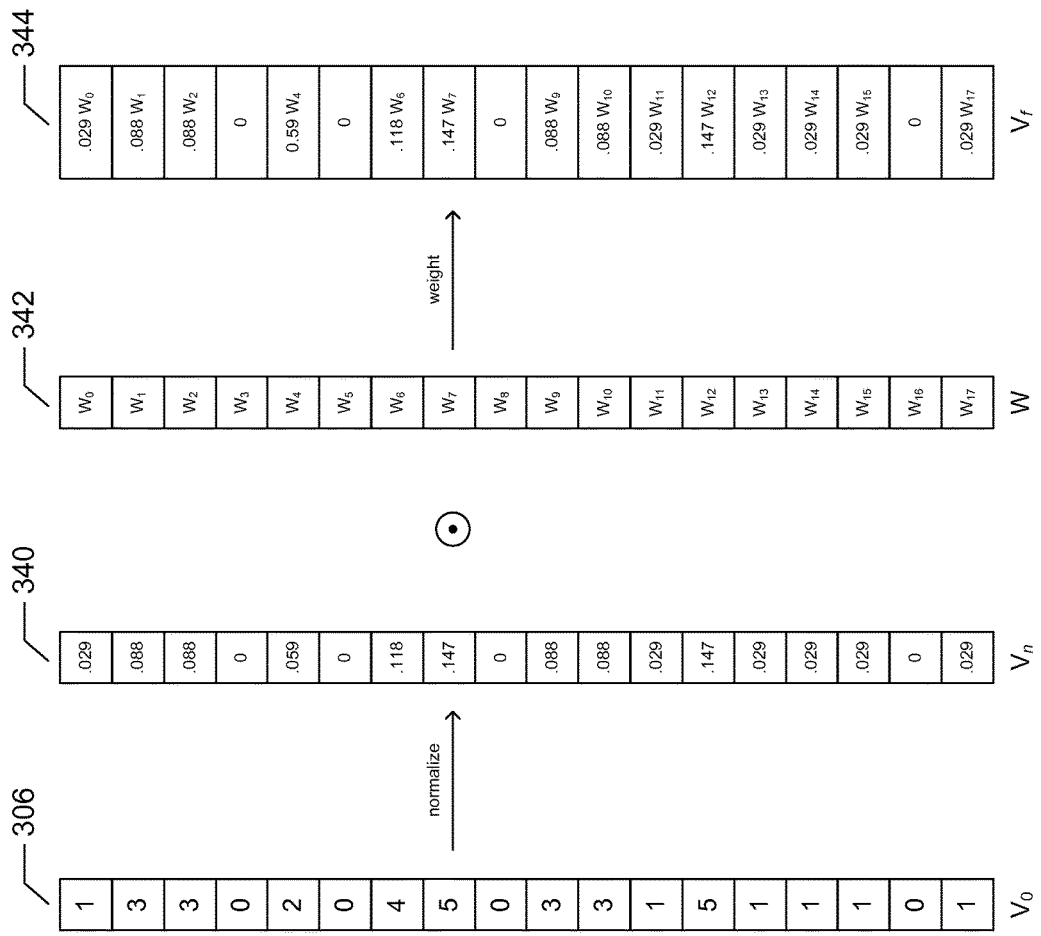

FIGS. 2-3E illustrate a text-comparison method that can be used determine the similarity between two documents, pages, or paragraphs with formatted or unformatted text. FIG. 2 illustrates a vector-based similarity metric. In FIG. 2, two three-dimensional vectors, vector A 202 and vector B 204 are compared by a well-known comparison technique. In general, the technique can be used for n-dimensional vectors. The two vectors can be expressed in terms of the coordinates of the points at the ends of the vectors, 206 and 208, using familiar coordinate-triplet expressions 210. The dot product of two vectors is defined according to expression 212 in FIG. 2. A magnitude, or length of the two vectors can be computed by computing the square root of the self dot product of the vectors, as shown in equation 214 in FIG. 2.

Using the definition of the dot product and the above-described computation of the magnitudes of the vectors, one can obtain an expression for the cosine of the angle $\theta$ 216 between the two vectors in terms of the coordinates of the vectors, shown in expression 218 in FIG. 2. The cosine of the angle between the two vectors can be used as a similarity metric for the two vectors. When the two vectors have the same direction, or, in other words, are parallel, the cosine of the angle between the two vectors is 1. When the two vectors have opposite directions, and are anti-parallel, the cosine of the angle between the two vectors is −1. The value of cos $\theta$ ranges from −1 to 1, and indicates the degree to which the two vectors have similar directions, or orientations. Using cos $\theta$ as a similarity metric ignores differences in the magnitudes of the vectors which, for the purpose of comparing text documents of different lengths, is advantageous. The magnitudes of the vectors can be included, as an additional term, in a more complex similarity metric computation, in alternative methods.

One general approach for computing a similarity metric for two text documents is to express each of the two text documents as a vector in an n-dimensional vector space and then to compute cos $\theta$ for the angle defined by the two vectors in the n-dimensional vector space, as discussed above with reference to FIG. 2. FIGS. 3A-E illustrate one approach to generating a vector that corresponds to a text document. As shown in FIG. 3A, a text document 302 can be considered to be a sequence of words. In FIG. 3A, each word, such as word 304, is represented by a rectangle. In the illustrated method, the vector corresponding to the text document 306 is a one-dimensional array with elements comprising numeric values. In FIG. 3A, prior to construction of an n-dimensional vector that represents a text document, all the elements of the vector, or array, 306 are set to 0. Each element in the vector is indexed by a word, such as the word 308, which indexes the first element of the vector 310. In many text-comparison methods, the set of words, shown in column 312, that index the elements of a vector 306 representing a text document is an alphabetically ordered list of normalized terms encountered in the two documents that are being compared, or an alphabetically ordered list of terms obtained from a dictionary, analysis of a corpus of documents, or by some other means. Construction of the n-dimensional vector representing the text document also employs a normalization and filtering module 316 which normalizes and filters input words to generate either a normalized word within the index of terms 312 or an indication that input word does not correspond to a word in the index, and therefore does not contribute to construction of the n-dimensional vector. As one example, the normalization and filtering module may choose to filter out, or ignore, articles, pronouns, and other commonly encountered words of low information content. As another example, the normalization and filtering module may transform a variety of different derived forms of a particular word into the root word of the derived forms. For example, plural terms may be converted to singular terms, capitalized letters may be converted to corresponding lower-case letters, and various verb forms may be converted to the singular, present-tense form of the verb, synonyms may be converted to particular alternative terms, and other such normalization tasks may be carried out.

Instruction of the n-dimensional vector proceeds sequentially, by extracting each word, in order, from the text document, inputting each extracted word to the normalization and filtering module 316, and using the corresponding output from the normalization and filtering module to update at most one element in the vector for each word extracted from the document. In FIG. 3A, a first word 320 is extracted from the document and input to the normalization and filter module 316. Output from the normalization and filtering module indicates that the first word 320 does not contribute to construction of the n-dimensional vector representing the document. The first word 320 may, for example, be an article. In FIG. 3B, the second word 322 of the document is extracted and input to the normalization and filtering module 316, which outputs the root or stem of a word that occurs as index word 324 in the index. The corresponding element 326 of the n-dimensional vector is incremented, to reflect an occurrence of the root word in the document. In FIG. 3C, the third word in the document 328 is processed similarly, resulting in incrementing a corresponding element 330 of the n-dimensional vector. Each next word in the document is similarly processed, resulting finally, as shown in FIG. 3D, in an initial vector $V_0$ 306 that includes, as elements, the number of times each of the indexing root words occurs in the text document. As shown in FIG. 3E, this initial vector, $V_0$, 306 is then arithmetically normalized to produce a normalized vector 340. Normalization may involve dividing each of the entries in the vector by the total sum of entries in the initial vector $V_0$. Alternative normalization methods may be used. The normalized vector, $V_n$, 340 is then multiplied, element-by-element, by a normalized weight vector 342 to produce a final vector, $V_f$, 344 that represents the text document. The weights in the weight vector 342 are used to assign levels of significance, or importance, to each of the different indexing terms. Different normalized weight vectors may be used for text documents related to different subject areas, for example, to facilitate generation of meaningful similarity metrics on a document-domain basis.

Figure 4:
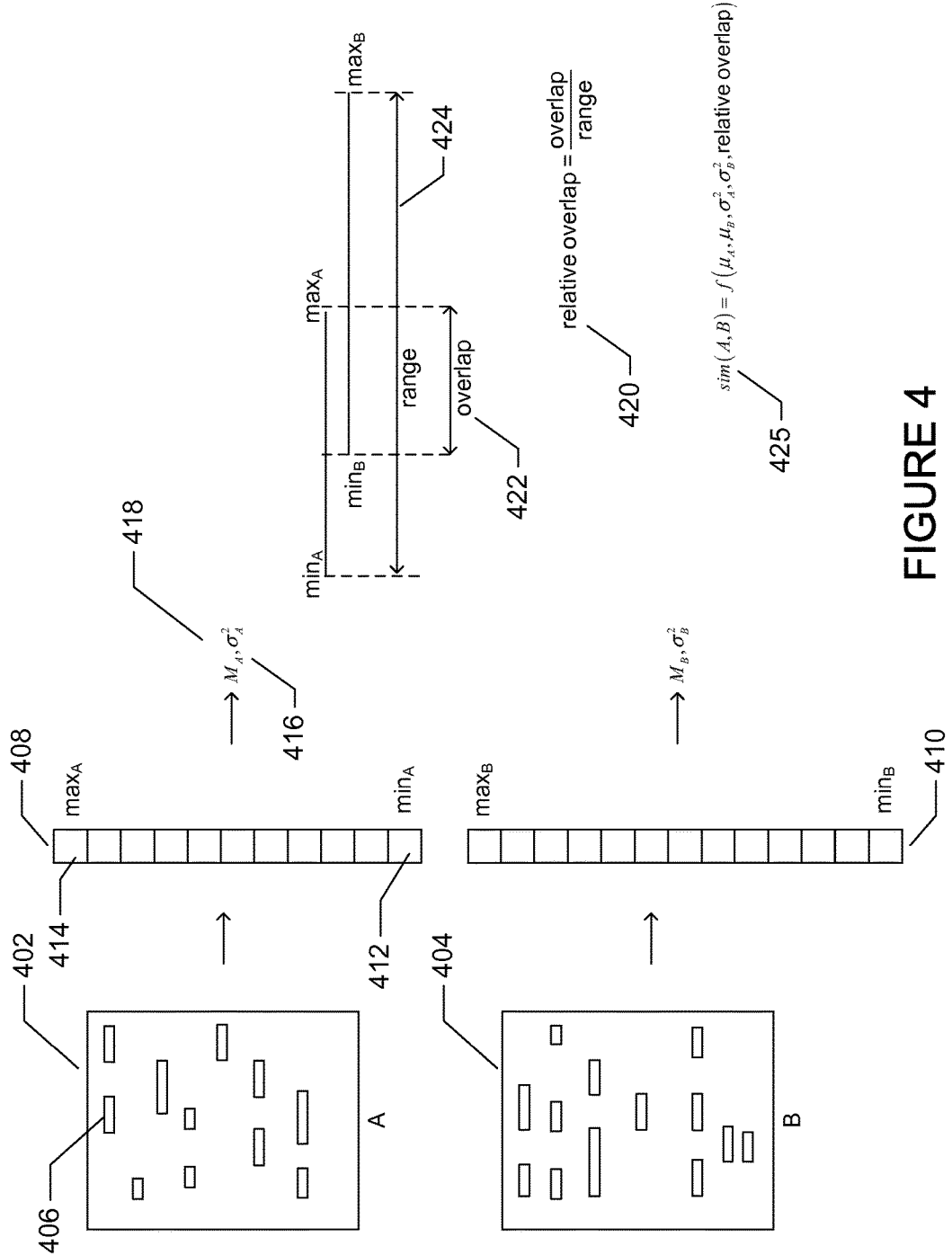
FIG. 4 illustrates comparison of numeric values, extracted from an electronic document, to produce a similarity metric that indicates the similarity of the two documents based on the numeric values contained within them.

FIG. 4 illustrates comparison of numeric values, extracted from an electronic document, to produce a similarity metric that indicates the similarity of the two documents based on the numeric values contained within them. In FIG. 4, two electronic documents 402 and 404 are shown to contain a number of numeric values, each numeric value represented by a rectangle, such as rectangle 406. The numeric values can be extracted from each document and placed into an array in numeric order 408 and 410, with the first element in each array, such as element 412, containing the numeric value with minimum value, and the final element, such as element 414, in each array containing the numeric value with maximum value, extracted from the corresponding document. A mean 416 and variance 418 can be easily computed for the numbers in each array. Moreover, a relative overlap 420 can be computed as the length of a region of overlap 422 between the ranges represented by the two arrays divided by the total combined range 424 of the two arrays. A similarity value, generally ranging between [0, 1], can then be computed by a function 425 that receives, as input parameters, the means, variances, and relative overlap. Many different arithmetic combinations of these computed values may be used to compute an overall similarity metric, in various alternative similarity-metric computational methods.

Figure 5:
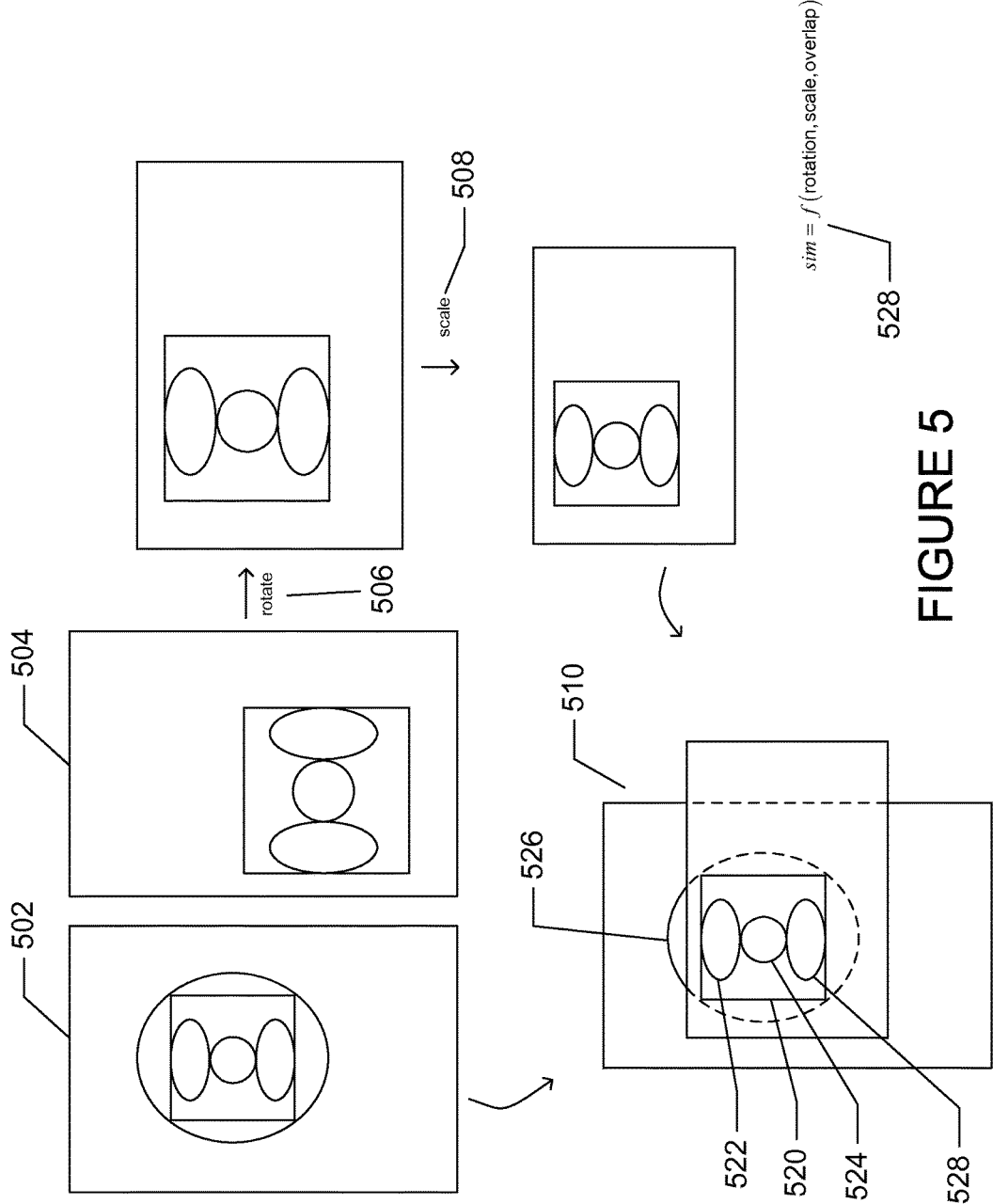
FIG. 5 shows a method for computing a similarity metric between two graphical images.

FIG. 5 shows a method for computing a similarity metric between two graphical images. In FIG. 5, electronic representations of a first graphical image 502 and a second graphical image 504 are compared. In a first step, the second graphical image is rotated 506 and scaled 508 to as closely approximate the first graphical image 502 as possible. Then, the rotated and scaled second image is superimposed over the first image 510, and a degree of overlap of the two images is computed. In the example shown in FIG. 5, the square 520, ellipses 522-523, and circle 524 of the first image and the second, rotated and scaled image overlap completely, while the outer ellipse 526 of the first image is not overlapped by a corresponding element in the second image. The number of pixels in the overlapping regions divided by the total number of pixels for the two superimposed images may, for example, be used as the relative overlap of the two graphical images. A similarity metric can be computed as a function of the rotation, scale, and degree of overlap 528. Additional factors may consider colors in colored images, geometric primitives, and other such image characteristics.

Figure 6:
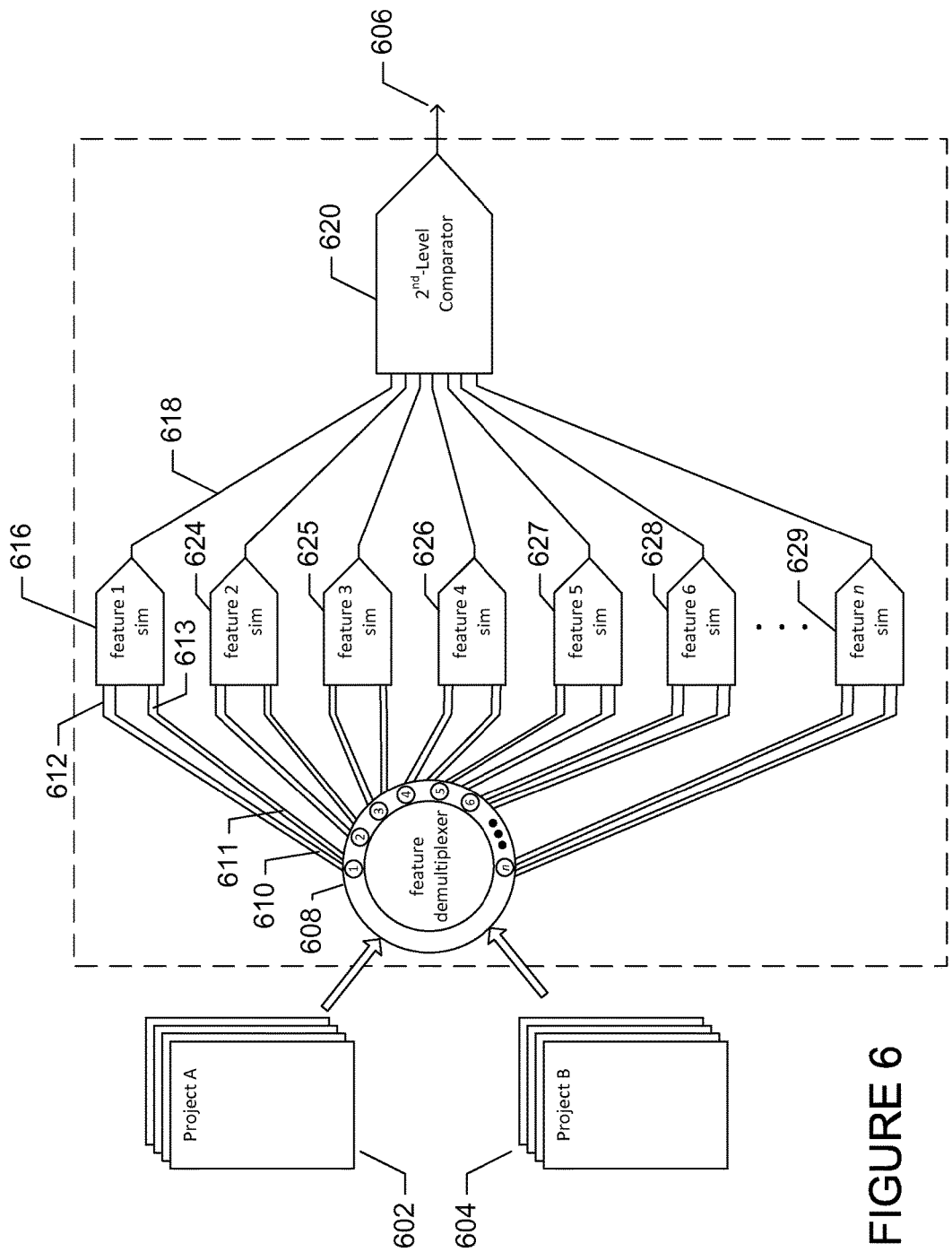
FIG. 6 shows an overall architecture of a computational project comparator that represents one embodiment of the present invention.

FIG. 6 shows an overall architecture of a computational project comparator that represents one embodiment of the present invention. The computational project comparator that represents one embodiment of the present invention receives two electronic-data representations of projects 602 and 604 as input and generates a real-valued similarity metric output 606 within the range [0, 1] that represents the similarity of the two projects to one another. A feature demultiplexer 608 extracts information from the two projects for each of n different features on which the project comparison is based. For example, the data corresponding to a first feature is extracted from the two projects by the feature demultiplexer and output 610-611 to the inputs 612 and 613 of a feature comparator 616 for the first feature that compares the information extracted from the two projects for the first feature 612 and 613 to produce a similarity metric 618 that is input to a second-level comparator 620. The various feature comparators 616 and 624-629 for the n features are generally data-type-specific comparators, such as the various different types of data-type-specific comparators discussed with reference to FIGS. 3A-E, 4, and 5. Two different feature comparators may be two instances of a common comparator type. For example, two different features may both have text-document data types and may therefore use a text-document data-type comparator, such as that discussed with reference to FIGS. 3A-E. Many different hybrid feature comparators are also possible. For example, a feature comparator for comparing financial statements associated with a project may employ both a text-document-comparator function, such as that described with reference to FIGS. 3A-E, as well as a numeric-value-comparator function, such as that discussed with reference to FIG. 4, producing a final similarity metric that is an arithmetic combination of similarity metrics produced by the text-document-comparison functionality and the numeric-value-comparison functionality.

The various different feature comparators generally include numerous tunable parameters. For example, the text feature comparator, discussed above with reference to FIGS. 3A-E, includes a weight vector, with the individual elements of the weight vector tunable in order to optimize the similarity metrics produced by the text feature comparator. The numeric feature comparator, discussed with reference to FIG. 4, may employ various constant multipliers of values computed from the mean, variance, and relative-overlap values. The second-level comparator 620 also generally applies multiplicative weights to the similarity metrics produced by the various feature comparators to produce a final similarity metric, and the weights applied by the second-level comparator to each of the similarity metrics produced by the feature comparators represent a set of tunable parameters for the project comparator, as a whole.

Figure 7:
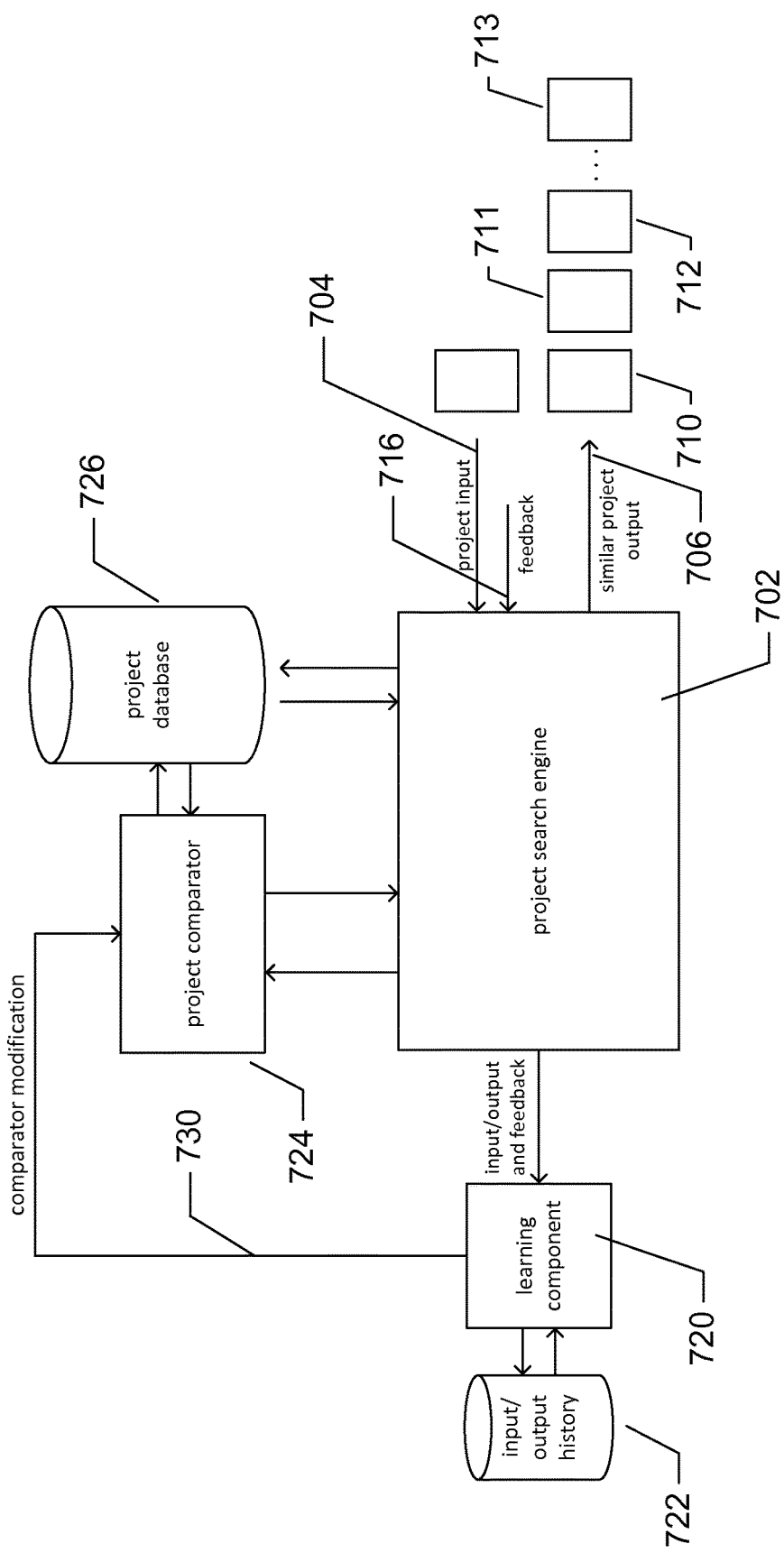
FIG. 7 illustrates a project search engine that represents a family of embodiments of the present invention.

FIG. 7 illustrates a project search engine that represents a family of embodiments of the present invention. The project search engine 702 receives, as input 704, a first project and returns 706, as output, a list of similar projects 710-713, in many embodiments sorted in descending or ascending project-comparator-produced similarity-metric-value order. A project search engine may additionally receive, as a final input 716, feedback from a user or from an application program related to the quality, or accuracy, of the output list of similar projects. This feedback, which, along with the original input 704 and output 706, is transmitted by the project search engine to a learning component 720 which stores the input/output history and feedback in a learning-component database 722 for subsequence analysis. The project search engine accesses a project comparator subsystem 724, discussed above with reference to FIG. 6, and a database of projects 726. The learning component 720 produces feedback 730 to the project comparator 724 to tune and re-weight the project comparator, based on input/output and feedback history, in order to optimize the similarity metrics produced by the project comparator. The project search engine locates, in the project database, a number of projects similar to an input project by pairwise comparison of the input project to all or a subset of the projects contained in the project database using the project comparator subsystem.

Figure 8A:
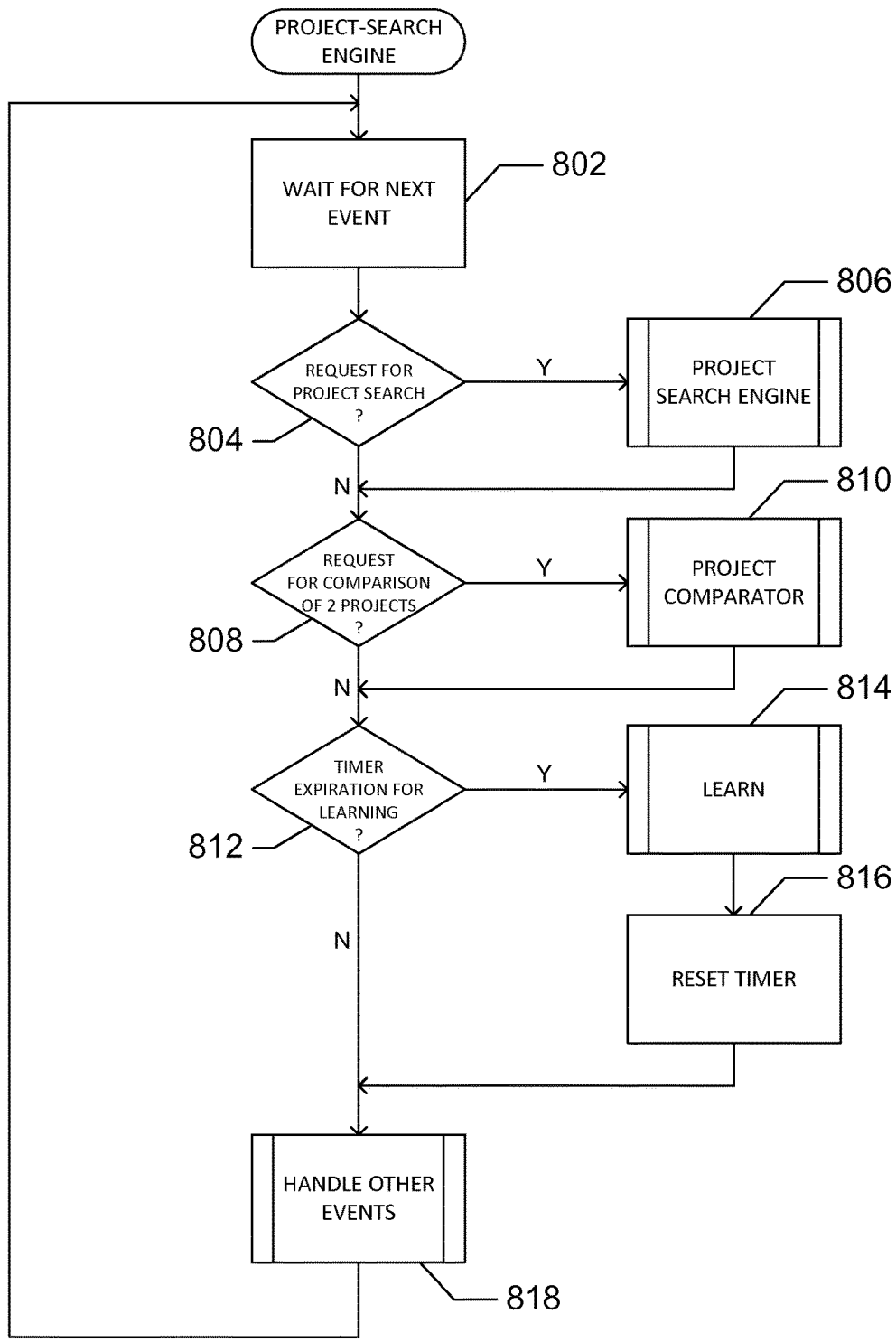
FIGS. 8A-E provide control-flow diagrams that illustrate operation of a project-search engine that represents one embodiment of the present invention.

FIGS. 8A-E provide control-flow diagrams that illustrate operation of a project-search engine that represents one embodiment of the present invention. FIG. 8A provides a control-flow diagram for an event handling loop for a project-search engine. In step 802, the project-search engine waits for a next event to occur. In other words, the described project-search engine that represents one embodiment of the present invention is an event-driven, continuously available module that can be accessed, through project-search-engine interfaces, by users and application programs. When an event occurs, and the event represents a request for a project search, as determined in step 804, then the project-search engine is invoked, in step 806, to search for projects related to an input project. Otherwise, when the event corresponds to a request for comparison of two projects, as determined in step 808, the project comparator subsystem is invoked, in step 810, to provide a similarity metric value that represents the similarity of the two projects to be compared, in step 810. When a timer has expired for the learning module, as determined in step 812, then the learning module is invoked, in step 814, to analyze stored input/output and feedback history in order to provide tuning modifications to the project comparator, as discussed with reference to FIG. 7. Then, in step 816, the timer is reset. The types of events, detected in steps 804, 808, and 812, are representative of many different possible events that may be detected and handled by the event-handling loop of a project-search engine. Other events, which may include additional timers, events associated with various maintenance and administrative functionality for the project-search engine, and other events are handled in a catch-all event handler routine 818. Thus, when awakened in step 802, the event handler may detect the occurrence of, and launch routines and other functionality to handle, multiple different events.

Figure 8B:
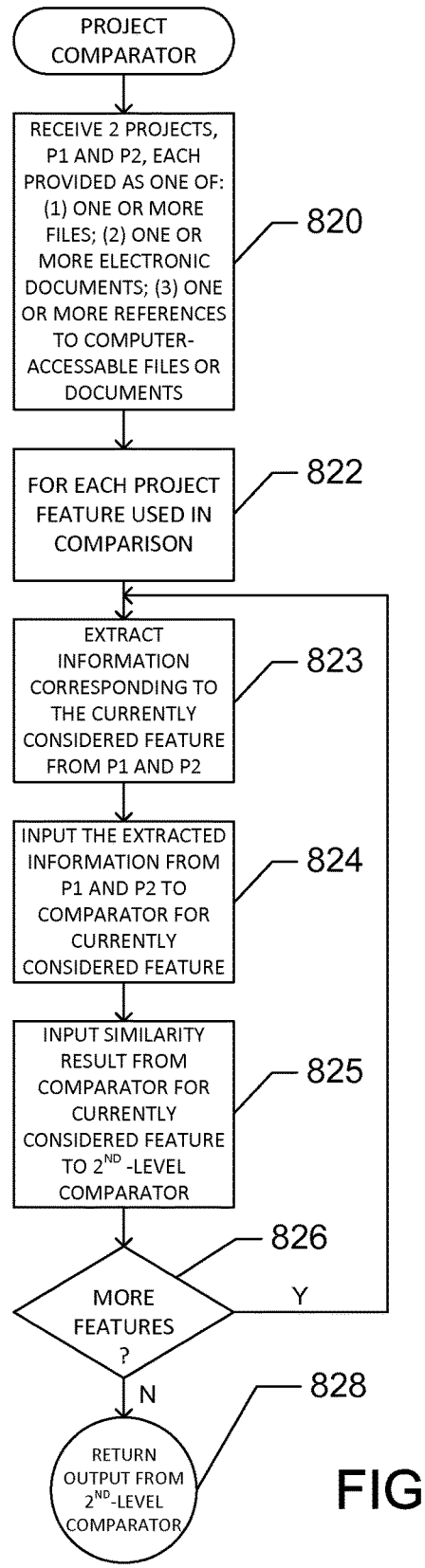

FIG. 8B provides a control-flow diagram for a project comparator, one implementation of which is discussed with reference to FIG. 6, which represents one embodiment of the present invention. In step 820, the project comparator receives two project inputs. The projects may be input as files, electronic documents, or reference to files, electronic documents, or other computer-accessible electronic-data representations of the two projects. In the for-loop of steps 822-826, each feature used by the project comparator in the comparison of the two projects is considered in a separate iteration of the for-loop. In step 823, information corresponding to the currently considered feature is extracted from the input projects and, in step 824, this extracted information is furnished to a feature comparator corresponding to the currently considered feature to produce a similarity-metric value, as discussed above with reference to FIG. 6. In step 825, the similarity-metric value produced by the feature comparator for the currently considered feature is then input to the second-level comparator. As discussed above, with reference to FIG. 6, the second-level comparator multiplies the similarity metrics input from the various feature comparators by corresponding weights, and computationally combines the weighted similarity metrics to produce an overall similarity-metric output, which is returned in step 828. Note that the project comparator may carry out iterations of the for-loop of steps 822-826 sequentially or in parallel fashion, depending on the operating system and/or hardware system above which the project comparator is implemented.

Figure 8C:
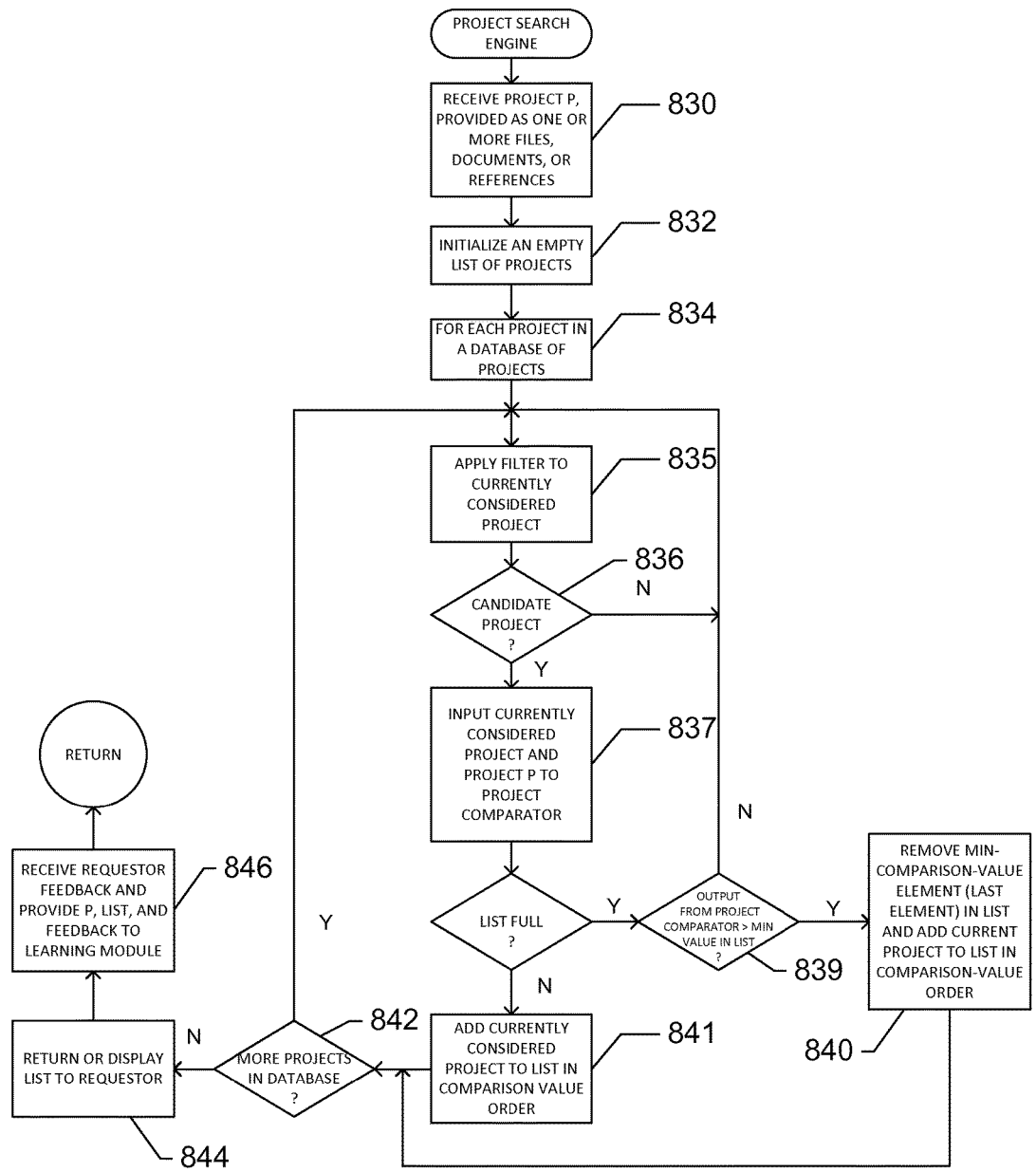

FIG. 8C provides a control-flow diagram for the project-search engine, which represents one embodiment of the present invention, described above with reference to FIG. 7. In step 830, the project-search engine receives a project as a file, set of electronic documents, or one or more references to files, electronic documents, or other electronic-data representation of the project. In step 832, a list of project/similarity-metric pairs is initialized to the empty list. Then, in the for-loop of step 834-842, the input project is compared to each of a number of projects stored in a project database to find similar projects which are entered into the list of project/similarity-metric pairs initialized in step 832, generally in similarity-metric-value order. Each iteration of this for-loop represents a pairwise comparison of the input project with a project extracted from the project database. In step 835, a filter is applied to the currently considered project extracted from the project database. This filter may determine, from the values of several key features or from other characteristics or parameters of the currently considered project, whether the project has sufficient indication of similarity to justify a project-comparator comparison, and is thus a candidate project. When the currently considered project is ascertained to be a candidate project, as determined in step 836, then the currently considered project and the input project are input to the project comparator, in step 837. If the list of project/similarity-metric pairs is full, as determined in step 838, and the output from the project comparator, called in step 837, is a similarity metric with a value greater than the minimum valued similarity metric contained in the list of project/similarity-metric pairs, as determined in step 839, then the project having the minimum similarity-metric value currently on the list is removed and the currently considered project is added, along with the corresponding similarity metric, to the list so that the list remains in similarity-metric-value order, in step 840. When the list is not full, the currently considered project is added to the list of project/similarity-metric pairs, along with the similarity metric produced by the project comparator for the currently considered project in step 837. When there are more projects in the project database to considered, as determined in step 842, control flows back to the beginning of the for-loop for a subsequent iteration of the for-loop. In step 844, the list of project/similarity-metric pairs, or a subset of the list of project/similarity-metric pairs with similarity metrics above a threshold value, are displayed to a user or returned to a requesting application and, in step 846, when the user or application return feedback, then the list of project/similarity-metric pairs and input project are transmitted, along with that feedback, to the learning module, as discussed above with reference to FIG. 7. Various applications and display interfaces may employ the similarity metrics associated with projects in the returned list to display projects in ascending or descending similarity-metric-value order, color code projects according to similarity value, or otherwise provide indications of the projects most similar to the input project.

Figure 8D:
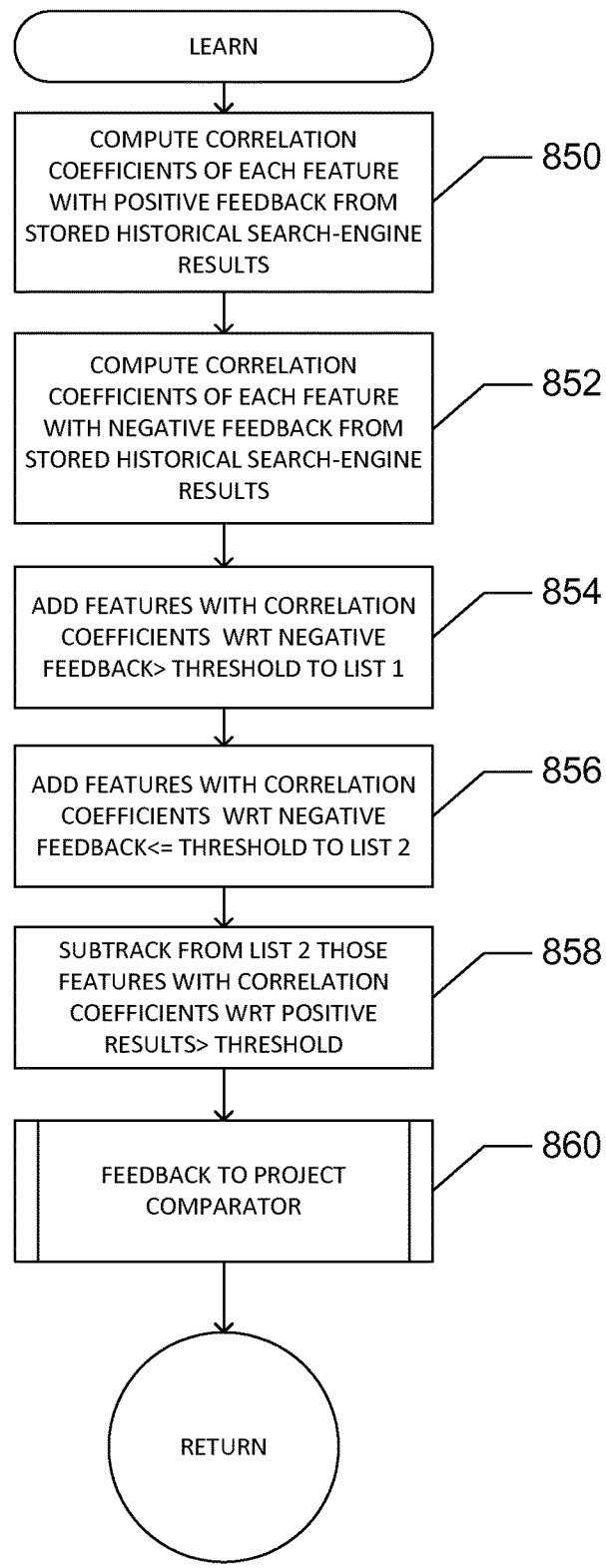

FIG. 8D provides a control-flow diagram for the learning module, which represents one embodiment of the present invention, discussed above with reference to FIG. 7. The learning module is invoked, at intervals, to analyze stored learning-module data, provided to the learning module by the project-search engine, in order to provide feedback to the project comparator. In step 850, the learning module computes correlation coefficients for each feature used in project comparison with a list of projects associated with positive feedback. In step 852, the learning module computes correlation coefficients of each feature with a list of projects associated with negative feedback. In step 854, features with correlation coefficients with respect to project lists associated with negative feedback greater than some threshold correlation-coefficient value are added to a first list. In step 856, the remaining features with correlation coefficients with respect to project lists associated with negative feedback less than or equal to the threshold value are added to a second list. In step 858, features with computed correlation coefficients with respect to project lists associated with positive results greater than a threshold value are removed from the second list. Thus, the first list includes features that appear to be strongly correlated with negative results and the second list includes features that are not strongly associated with negative results but also not strongly correlated to positive results. In step 860, the second portion of the learning-module functionality is invoked.

Figure 8E:
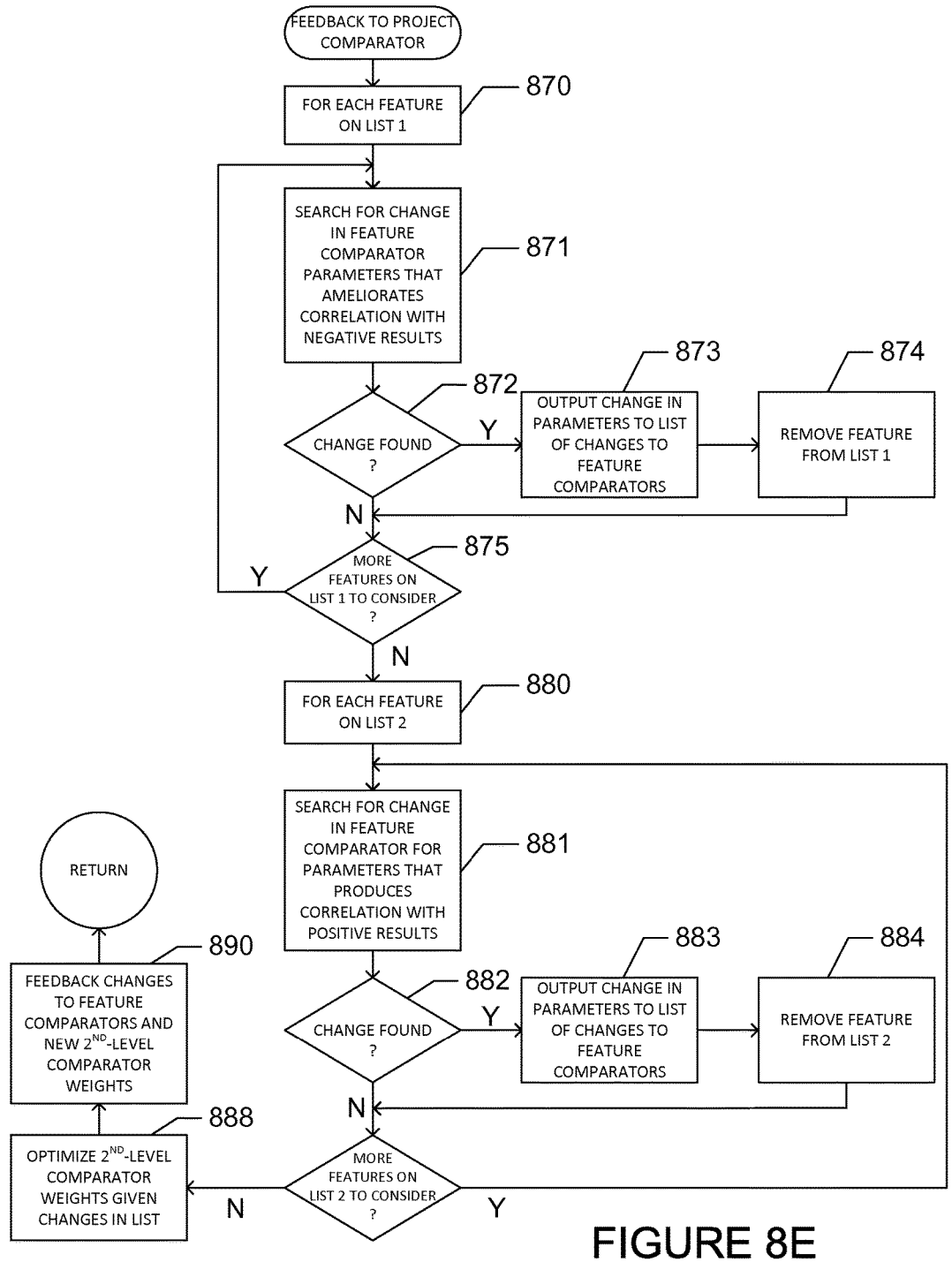

FIG. 8E provides a control-flow diagram for the remaining functionality of the learning module, invoked in step 860 of FIG. 8D. In the for-loop of steps 870-875, each feature on the first list is separately considered, in a single-pass traversal of the first list. In step 871, a change in feature-comparator parameters that would appear to ameliorate the correlation with negative results is searched for, by systematically altering feature-comparative parameters. When a change in the feature-comparator parameters is found to ameliorate the correlation with negative results, as determined in step 872, then those changes are output to a list a changes, in step 873, and the feature is removed from list 1. In a second for-loop of steps 880-885, a similar traversal of the second list is made, this time looking for changes to the feature-comparator parameters that would produce a correlation with positive results. If such changes are found, then they are output to the list of changes in step 883, and the currently considered features removed from list 2. In step 888, an optimization method is carried out on the weights applied by the second-level comparator, given changes to the feature comparators according to the list of changes, to produce second-level similarity metrics that best track feedback with respect to the project-list results. Finally, in step 890, the changes to the feature comparators and weights to be applied by the second-level comparator are transmitted to the project comparator, as discussed above with reference to FIG. 7, to tune the project comparator based on the stored feedback. The learning module may be invoked at regular intervals, when sufficient feedback has accumulated to justify a next retuning of the project comparator, or according to other events and timings, such as when feedback from users or application programs indicates that the similarity metrics produced by the project comparator do not well correspond to expectations or external measures of similarity.

The project-search engine that represents one embodiment of the present invention, as discussed above with reference to FIG. 7 and FIGS. 8A-E can, in turn, be used by a number of different project-management applications as well as directly by project managers and other users. In one application, as a project manager begins to develop an electronic-data representation of a project, a project-development tool searches for, and locates similar projects using the project-search engine, to assist the project manager in development of the current project. For example, the project manager may access the electronic-data representations of similar projects in order to use portions of those electronic-data representations in developing the new project. As another example, a project-manager-monitoring application may use the project-search engine to identify projects similar to those projects managed by a particular project manager in order to ascertain the relative success rate for the project manager as well as to identify positive and negative characteristics of the project manager.

Figure 9:
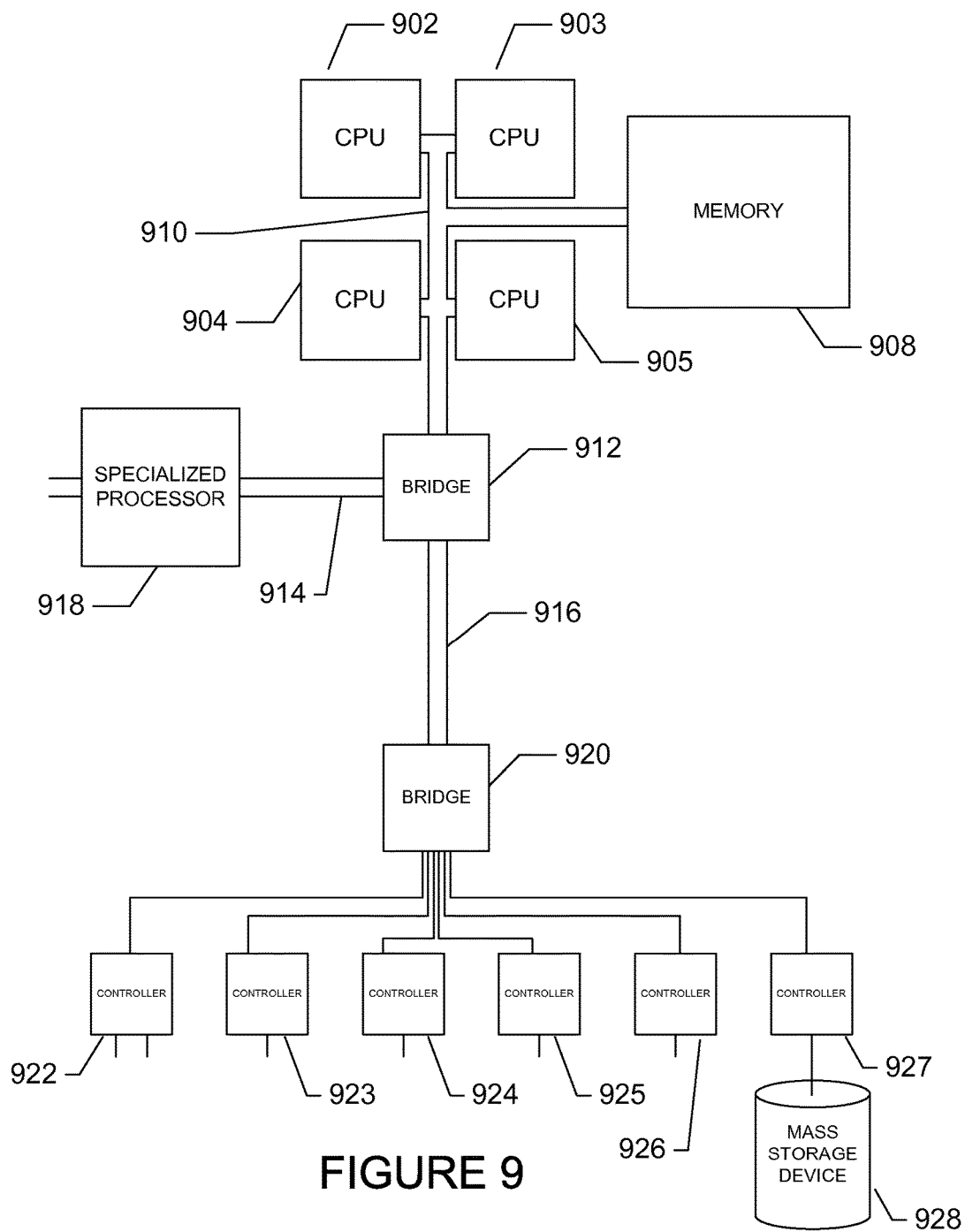
FIG. 9 illustrates a typical electronic computer on which project search engines, project comparators, and other embodiments of the present invention may be implemented.

FIG. 9 illustrates a typical electronic computer on which project search engines, project comparators, and other embodiments of the present invention may be implemented. The computer system contains one or multiple central processing units ("CPUs") 902-905, one or more electronic memories 908 interconnected with the CPUs by a CPU/memory-subsystem bus 910 or multiple busses, a first bridge 912 that interconnects the CPU/memory-subsystem bus 910 with additional busses 914 and 916, or other types of high-speed interconnection media, including multiple, high-speed serial interconnects. These busses or serial interconnections, in turn, connect the CPUs and memory with specialized processors, such as a graphics processor 918, and with one or more additional bridges 920, which are interconnected with high-speed serial links or with multiple controllers 922-927, such as controller 927, that provide access to various different types of mass-storage devices 928, electronic displays, input devices, and other such components, subcomponents, and computational resources. Embodiments of the present invention may also be implemented on distributed computer systems and can also be implemented partially in hardware logic circuitry.

Although the present invention has been described in terms of particular embodiments, it is not intended that the invention be limited to these embodiments. Modifications will be apparent to those skilled in the art. For example, a project comparator subsystem and project-search engine that represent embodiments of the present invention may be implemented in a variety of different ways by varying any of the many well-known implementation parameters, including programming language, operating system, modular organization, data structures, control structures, and other such parameters. As discussed above, any of various different feature comparators may be employed within the project comparator, based on the data types of features and other considerations. The second-level comparator within the project comparator may simply sum weighted similarity metrics produced by the various feature comparators, or may carry out any of various other computational combinations of the results produced by the feature comparators to produce a final project-comparator similarity metric. The project-search engine that represents one embodiment of the present invention may be directly used by human users through a project-search-engine interface or may alternatively be invoked by any of a variety of different project-management applications and tools The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A system comprising:
   at least one non-transitory computer-readable storage medium to store electronically-represented projects represented by computer-accessible data;
   at least one processor;
   a project-comparator subsystem executable on the at least one processor, wherein the project-comparator subsystem comprises at least one first level feature comparator and a second level comparator;
   a project search engine executable on the at least one processor to:
      receive data that represents a first electronically-represented project;
      invoke the project-comparator subsystem to compare the received first electronically-represented project to at least one of the stored electronically-represented projects, wherein to compare the received first electronically-represented project to at least one of the stored electronically-represented projects, the project-comparator subsystem is to:
         extract features from the first electronically-represented project and the at least one of the stored electronically-represented projects;
         determine, by the at least one first-level comparator, a similarity metric for each of the extracted features; and
         determine, by the second-level comparator, an overall similarity metric, by applying weights to the similarity metrics for the extracted features, and computationally combing the weighted similarity metrics; and
   a learning module executable on the at least one processor to:
      receive a feedback regarding similarity between the first electronically-represented project and the at least one of the stored electronically-represented projects; and
      compute adjustments to the second-level comparator in response to the received feedback.

2. The system of claim 1, wherein the received feedback is from a user or a program.

3. The system of claim 1, wherein the received feedback relates to an accuracy of identification of the electronically-represented projects as being similar by the project search engine.

4. The system of claim 1, wherein the adjustments comprise adjustments of tunable parameters used by the project-comparator subsystem to generate the similarity metrics.

5. The system of claim 4, wherein the learning module is to:
   identify a first subset of the features associated with a positive feedback, and identify a second subset of the features associated with a negative feedback; and
   modify the tunable parameters based on the first and second subsets of the features.

6. The system of claim 5, wherein the modifying of the tunable parameters is to ameliorate correlation with the second subset of the features, and to produce correlation with the first subset of the features.

7. The system of claim 1, wherein the at least one first level feature comparator includes feature comparators to compare an extracted text from the stored electronically-represented projects by creating a term-occurrence vector from the extracted text for each stored electronically-represented project and computing a cosine of an angle between the term-occurrence vectors.

8. The system of claim 1, wherein the at least one first level feature comparator includes feature comparators to compare numerical values extracted from the stored electronically-represented projects.

9. The system of claim 1, wherein the at least one first level feature comparator includes feature comparators to compare a figure or graphical data extracted from the stored electronically-represented projects by rotating and scaling the figure or graphical data extracted from a first of the stored electronically-represented projects with respect to the figure or graphical data extracted from a second of the stored electronically-represented projects, and to compute a metric corresponding to an overlap of features within the figure or graphical data extracted from the first of the stored electronically-represented projects and the figure or graphical data extracted from the second of the stored electronically-represented projects.

10. The system of claim 1 wherein the learning module is to be repeatedly invoked at respective points in time.

11. A method comprising:
   receiving an electronically-represented project by a project search engine implemented on one or more computer systems;
   comparing, by a project-comparator subsystem, the received electronically-represented project to at least one of stored electronically-represented projects, wherein the comparing comprises:
      extracting features from the received electronically-represented project and the at least one of the stored electronically-represented projects;
      determining, by at least one first-level comparator of the project-comparator subsystem, a similarity metric for each of the extracted features; and
      determining, by a second-level comparator project-comparator subsystem, an overall similarity metric, by applying weights to the similarity metric for the extracted features, and computationally combining the weighted similarity metrics; and
   receiving, by a learning module, a feedback regarding similarity between the received electronically-represented project and the at least one of the stored electronically-represented projects; and
   computing, by the learning module, adjustments to the second-level comparator in response to the received feedback.

12. The method of claim 11, wherein the adjustments comprise adjustments of tunable parameters used by the project-comparator subsystem to generate the similarity metric for the at least one of the stored electronically-represented projects.

13. The system of claim 12, further comprising:
identifying, by the learning module, a first subset of the features associated with a positive feedback;
identifying, by the learning module, a second subset of the features associated with a negative feedback; and
modifying, by the learning module, the tunable parameters based on the first and second subsets of the features.

14. The method of claim 13, wherein modifying the tunable parameters ameliorates correlation with the second subset of the features, and produces correlation with the first subset of the features.

15. The method of claim 13, further comprising using data stored to represent the at least one of the stored electronically-represented projects comprising the first subset of the features to further develop and manage the received electronically-represented project.

16. The method of claim 11, further comprising invoking the learning module repeatedly to compute the adjustments.

17. A non-transitory computer-readable storage medium storing machine readable instructions that upon execution by at least one processor cause the at least one processor to:
compare, by a project-comparator subsystem executed by the at least one processor, the received electronically-represented project to at least one of stored electronically-represented projects, wherein to compare comprises:
extract features from the received electronically-represented project and the at least one of the stored electronically-represented projects;
determine a similarity metric for each of the extracted features; and
determine an overall similarity metric by applying weights to the similarity metric for the extracted features, and computationally combining the weighted similarity metrics; and
receive a feedback regarding similarity between the received electronically-represented project and the at least one of the stored electronically-represented projects; and
compute adjustments to the project-comparator subsystem in response to the received feedback.

18. The non-transitory computer-readable storage medium of claim 17, wherein the adjustments comprise adjustments of tunable parameters used by the project-comparator subsystem to generate the similarity metric for the stored electronically-represented projects, and wherein the instructions upon execution cause the system to:
identify a first subset of the features associated with a positive feedback;
identify a second subset of the features associated with a negative feedback; and
modify the tunable parameters based on the first subset of the features and on the second subset of the features.

* * * * *